US009016432B2

(12) United States Patent
Hartman et al.

(10) Patent No.: US 9,016,432 B2
(45) Date of Patent: *Apr. 28, 2015

(54) DESCENT CONTROL DEVICE

(75) Inventors: Gregory A. Hartman, Drayton Valley (CA); Dan S. Smith, Drayton Valley (CA)

(73) Assignee: Rapid Egress Descent Systems Ltd., Drayton Valley (CA)

(*) Notice: Subject to any disclaimer, the term of this patent is extended or adjusted under 35 U.S.C. 154(b) by 315 days.

This patent is subject to a terminal disclaimer.

(21) Appl. No.: 13/599,638

(22) Filed: Aug. 30, 2012

(65) Prior Publication Data

US 2013/0048422 A1   Feb. 28, 2013

Related U.S. Application Data

(63) Continuation-in-part of application No. 12/331,105, filed on Dec. 9, 2008, now Pat. No. 8,272,476.

(30) Foreign Application Priority Data

Dec. 10, 2007 (CA) ..................... 2613855

(51) Int. Cl.
*A62B 1/16* (2006.01)
*A62B 1/08* (2006.01)
*B60T 13/58* (2006.01)

(52) U.S. Cl.
CPC *A62B 1/08* (2013.01); *B60T 13/586* (2013.01)

(58) Field of Classification Search
CPC .............. A62B 1/02; A62B 1/20; A62B 1/00; A62B 1/14; A62B 1/06; A62B 35/00; B63B 27/18
USPC ..................... 182/10, 11, 5, 36, 37, 234, 235; 187/350
See application file for complete search history.

(56) References Cited

U.S. PATENT DOCUMENTS 4,216,844 A   8/1980  Klafs
4,538,703 A   9/1985  Ellis et al.

(Continued)

FOREIGN PATENT DOCUMENTS

CA    2539883    8/2007

OTHER PUBLICATIONS

Printout from the Wikipedia web-site located at the URL http:/en.wikipedia.org/wiki/Eddy_current_brake (Accessed Aug. 14, 2008).

(Continued)

*Primary Examiner* — Katherine Mitchell
*Assistant Examiner* — Johnnie A Shablack
(74) *Attorney, Agent, or Firm* — Caesar Rivise, PC (57) ABSTRACT

A descent control device for controlling rotational motion of an object includes: at least one drive assembly for rotationally engaging the rotating object; a first substantially planar ferromagnetic moving element in rotationally locked engagement with at least one drive assembly and comprising at least one recess formed in a surface thereof having at least one magnet fixedly disposed therein; a second substantially planar ferromagnetic moving element in rotationally locked engagement with at least one drive assembly, and comprising at least one recess formed in a surface thereof having at least one magnet fixedly disposed therein; and at least one conducting plate disposed proximate the first and second moving elements. A magnetic field may be induced by rotational movement of the first or second moving element relative to at least one conducting plate in a direction to oppose acceleration of at least one drive assembly as it rotationally engages the object.

12 Claims, 5 Drawing Sheets

(56) References Cited

U.S. PATENT DOCUMENTS

| | | | |
|---|---|---|---|
| 4,567,963 | A | 2/1986 | Sugimoto |
| 4,826,150 | A | 5/1989 | Minoura |
| 5,477,094 | A | 12/1995 | Lamb |
| 5,669,469 | A | 9/1997 | Ericson et al. |
| 6,293,376 | B1 | 9/2001 | Pribonic |
| 6,397,974 | B1 | 6/2002 | Adifon et al. |
| 6,830,126 | B2 | 12/2004 | Godwin |
| 7,513,334 | B2 | 4/2009 | Calver |
| 7,588,127 | B2 | 9/2009 | Shiratsuki et al. |
| 2005/0098383 | A1 | 5/2005 | Halevy |
| 2008/0164102 | A1 | 7/2008 | Hashiguchi |
| 2008/0223666 | A1 | 9/2008 | Cuthbert |
| 2009/0249712 | A1 | 10/2009 | Brickell et al. |
| 2010/0065373 | A1 | 3/2010 | Stone et al. |

OTHER PUBLICATIONS

Printout from the Wikipedia web-site located at the URL http://en.wikipedia.org/wiki/Eddy_currents (Accessed Nov. 14, 2007).

Printout from the Physlink.com web-site located at the URL http://www.physlink.com/Education/AskExperts/ae527.cfm (Accessed Nov. 14, 2007).

Printout from the Wikipedia web-site located at the URL http://en.wikipedia.org/wiki/lenz%27s_law (Accessed Dec. 10, 2007).

Printout of demonstration of the Eddy Current effect with an aluminum block in an MRI at http://youtube.com/watch?v+fxC-AEC0ROk (Accessed Dec. 10, 2007).

Printout of web-site located at the URL http://www.landspeed.com/researchbraking.html (Accessed Dec. 10, 2007).

Printout of web-site located at the URL http://hyperphysics.phy-astr.gsu.edu/hbase/magnetic/elemag.html (Accessed Dec. 10, 2007).

DESCENT CONTROL DEVICE

RELATED APPLICATIONS

The present application is a continuation in part of application Ser. No. 12/331,105, entitled "Descent Control Device", filed on Dec. 9, 2008, and claiming priority from Canadian Patent Application No. 2,613,855 entitled "Egress Descent Control Device" which was filed on Dec. 10, 2007. Both of the aforementioned applications are incorporated by reference herein in their entirety.

FIELD

The present application relates to apparatus for controlling the descent rate of a structure along a cable, and more particularly to a descent control device for controlling the speed of descent of a cable-suspended apparatus for emergency escape from a platform on a rig.

BACKGROUND

Often it is necessary to have someone working on a rig platform (such as a derrick tubing board, for example). Sometimes, however, rig workers on such platforms are faced with a blowout or fire or some other kind of accident and need to escape quickly from the platform in order to avoid being seriously or fatally injured. Various t-bar or chair-based systems exist for providing a means for escaping from such platforms; however a difficulty encountered with known escape systems is that functionally impaired workers (e.g. workers who are in a state of shock as a result of the accident, or workers who have been burned, or disoriented by gases as a result of the accident) can have difficulties in accessing and operating them.

In Canadian Patent Application no. 2,539,883 filed Mar. 16, 2006 by Boscher et al and entitled APPARATUS FOR ESCAPING AREA OF ACCIDENT, which is incorporated by reference in its entirety herein, an apparatus is provided for emergency escape from a drilling rig platform along a path defined by at least one cable extending between the platform and a remote, terminal location. The apparatus includes a frame in which a top of the frame is located above a bottom of the frame when the frame is erect. The frame defines an interior space large enough to accommodate a worker. A locking system includes a locking mechanism and also a foot-actuated disengager that is located at least proximate to the bottom of the frame. The locking mechanism is adapted to interlock with a mating portion on the platform to prevent the frame from traveling away from the platform when the locking mechanism engages the mating portion. The disengager is connected to the locking mechanism and has a foot receiving surface region upon which force can be applied to displace the disengager between a first, engaged position and a second position to disengage the locking mechanism from the mating portion. The frame will travel away from the platform to the terminal location under gravity when the locking mechanism is disengaged.

The Boscher et al. device uses an automatic braking system attached at the bottom of the frame, beneath the disengager to permit quick descent along the path defined by the cable, but still sufficiently slowed down to prevent an excessively forceful impact when the frame arrives at the terminal location. Conventional systems include braking systems that employ hand actuated levers (including overriding automatic brake settings). A preferred system disclosed in the Boscher et al device is the Rollgliss® Rescue Emergency Descent Device friction brake, model no. 3303001 manufactured by DBI/SALA & Protecta. This system employs a series of brake pads that expand into a brake drum during descent to slow descent to a rate of about 15 feet/second.

Because of the intangible factors that will affect braking power with such systems, the rate at which enclosures equipped with such systems will fail will invariably have considerable variability, which makes it difficult to ensure compliance with applicable safety standards, such as those mandated by the Canadian Association of Oilwell Drilling Contractors (CAODC). Such standards mandate, amongst other things, that the enclosure land with a speed no greater than 12 ft/s.

The release of the pod pulls on the spooled cable, causing the pads to be placed in frictional contact with a drum to slow the descent of the pod. The physical contact between the pads and the drum creates a potentially hazardous risk of overheating of the components and cable and causes wear on both items which must be taken into account in maintenance operations, especially given that the device is hopefully only sporadically used. Additionally, both the pads and the drum should be subjected to regular maintenance and/or inspections to ensure that corrosion does not build up on either surface which may deleteriously impact the gripping performance of the braking system. Indeed, such braking systems face re-certification inspections after use and on a semi-annual or annual basis.

Moreover, such braking systems have a latch mechanism that call for manual engagement of a spooled cable clasp when the enclosure was brought to the side of the derrick or structure. Such manual engagement necessarily incurs a risk of human error, which, in the frenetic occasions when the pod is to be used, could have catastrophic consequences.

SUMMARY

In accordance with an embodiment of the invention, a descent control device for controlling rotational motion of an object is disclosed. The device comprises at least one drive assembly configured for rotationally engaging the rotating object to be controlled, a first substantially planar ferromagnetic moving element in rotationally locked engagement with the at least one drive assembly, the first moving element comprising at least one recess formed in a surface thereof having at least one magnet fixedly disposed therein, a second substantially planar ferromagnetic moving element in rotationally locked engagement with the at least one drive assembly, the second moving element comprising at least one recess formed in a surface thereof having at least one magnet fixedly disposed therein, and at least one conducting plate disposed proximate to the first and second moving elements. A magnetic field may be induced by rotational movement of the first moving element or the second moving element relative to the at least one conducting plate in a direction to oppose acceleration of the at least one drive assembly as it rotationally engages the object to be controlled.

BRIEF DESCRIPTION OF THE DRAWINGS

The embodiments of the present application will now be described by reference to the following figures, in which identical reference numerals in different figures indicate identical elements and in which.

DETAILED DESCRIPTION

The present application will now be described for the purposes of illustration only, in conjunction with certain embodiments shown in the enclosed drawings. While preferred embodiments are disclosed, this is not intended to be limiting. Rather, the general principles set forth herein are considered to be merely illustrative of the scope of the present application and it is to be further understood that numerous changes covering alternatives, modifications and equivalents may be made without straying from the scope of the present application, as defined by the appended claims.

In particular, all dimensions described herein are intended solely to be exemplary for purposes of illustrating certain embodiments and are not intended to limit the scope of the invention to any embodiments that may depart from such dimensions as may be specified.

Figure 1:
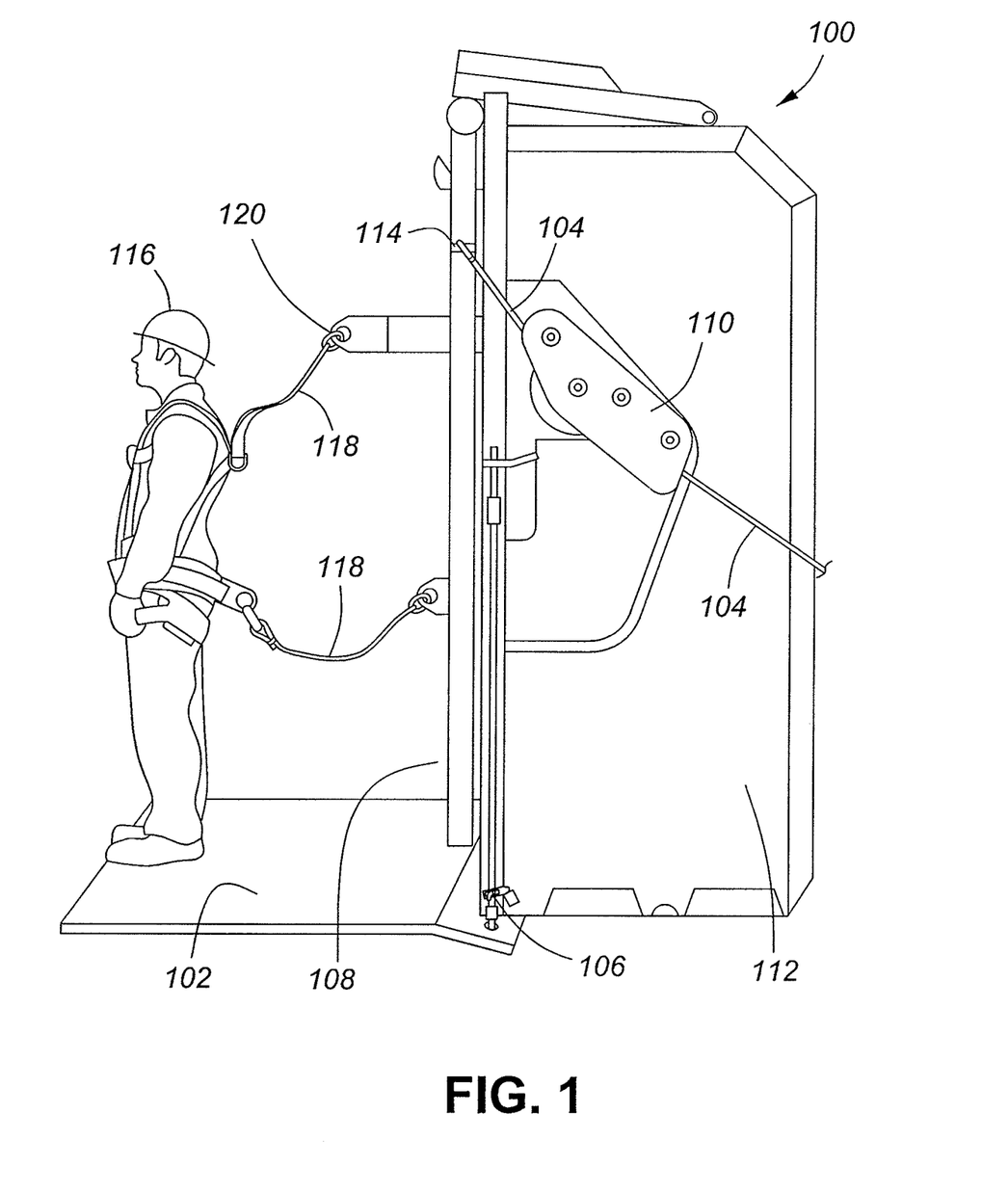
FIG. 1 is a perspective view of a platform with an enclosure attached by means of a cable between the platform and a terminal location.

Referring first to FIG. 1, there is shown, an existing embodiment of an enclosure shown generally at 100 that is secured in position next to a platform 102 by a cable 104 and a locking mechanism 106. The enclosure 100 is accessible from the platform 102 by an exit 108. The enclosure 100 includes a braking assembly 110 affixed to a metal frame 112 of the enclosure 100. The cable 104 is affixed, at one end, to the platform 102 by a platform anchor 114, and at the other end, to a terminal anchor (not shown) at the terminal location (not shown). The cable 104 runs through the braking assembly 110 such that the cable 104 defines the path of descent of the enclosure 100 when the enclosure 100 is released from the platform 102. As will be described in greater detail in FIG. 2 and FIG. 3, the cable 104 is acted upon by the braking assembly 110 to slow the descent of the enclosure 100.

Preferably, the cables 104 used are ½-inch diameter steel cables.

Preferably, the platform anchor 114, connected to one end of cable 104, is several feet above the exit 108. The other end of cable 104 is connected to a terminal anchor (not shown) at the terminal location (not shown). The terminal location is located at a lower elevation and safely distant from the platform 102. Preferably, the terminal location is horizontally distanced about 80 to 100 feet from the platform 102. Preferably, each cable 104 is connected between the platform 102 and the terminal location by screwed in anchors that have been pull tested.

The platform 102 is generally of such design that an exit 108 is formed at the location where the enclosure 100 is releasably secured to the platform 102 such that a rig worker 116 can depart the platform 102 through exit 108 and enter enclosure 100.

Preferably, the platform 102 is at an elevated location on a rig of the type used for drilling or servicing of wells, for example. Those skilled in the art will appreciate that at least some example embodiments of the enclosure with descent control device disclosed herein are suitable for use in conjunction with other types of platforms such as a racking board or monkey board, for example.

The enclosure 100 is a rigid structure designed for providing a vehicle for a rig worker 116 to depart the platform 102 in the case of an accident such as a blowout or the like. Preferably, the enclosure 100 comprises a metal frame 112 composed of a plurality of metal members that define an interior space of the enclosure 100 at least sufficiently large to accommodate one rig worker 116. A rig worker 116 on the platform 102 can enter the enclosure 100 by departing the platform 102 through the exit 108 to enter the interior space of the enclosure 100.

It will be understood that the enclosure 100 could be brought up from the terminal location to a position adjacent to the platform 102 by one of a number of different methods. In some embodiments, the weight of the enclosure 100, including contents such as passengers or cargo may be, but is not limited to, approximately 700 lbs.

To releasably secure the enclosure 100 to the platform 102, a locking mechanism 106 is employed between the enclosure 100 and platform 102. The enclosure 100 remains secured to the platform 102 adjacent to the exit 108 when the locking mechanism 106 is engaged. The locking mechanism 106 is disengaged by a rig worker 116 entering the enclosure 100.

Disengaging the locking mechanism 106 triggers the release of the enclosure 100 from the platform 102 commencing descent of the enclosure 100 from its location adjacent to platform 102 along the path defined by cable 104 to a terminal location (not shown).

To protect a rig worker 116 from an accidental fall off of a rig platform, it is typical for a number of safety lines 118 to be employed. Each safety line 118 connects the rig worker 116 to either the platform 102 or the enclosure 100. Lanyards 120 connect each end of a safety line 118 to one of the rig worker 116, platform 102, or enclosure 100.

Referring for instance to the example embodiment illustrated in FIG. 1, the two safety lines 118 connect the rig worker 116 to the enclosure 100 rather than the platform 102. The impact of this setup is that a rig worker 116 in an accident situation can save the time and effort of disconnecting lanyards 120 from the platform 102 and reconnecting them to the enclosure 100 before exiting the platform 102.

When a rig worker 116 enters the enclosure 100 releasing the locking mechanism 106, the enclosure 100 will automatically commence its descent from its initial location proximate to platform 102 to a terminal location at a decreased elevation and increased horizontal displacement from the platform 102. The path of descent of the enclosure 100 is defined by the cable 104 which runs through the braking assembly 110. The cable 104 is anchored to the platform 102 at one end by platform anchor 114, and anchored at the other end to the terminal location (not shown) by a terminal anchor (not shown).

In FIG. 1, a single cable 104 and a single braking assembly 110 are shown, however embodiments of an enclosure 100 with multiple braking assemblies 110 each operating upon a different cable 104 are also envisioned within the scope of the present invention. Preferably, two braking assemblies 110 are affixed on opposite sides of the enclosure 100. Each braking assembly 110 operates upon one of two cables 104, with those cables 104 appropriately anchored to define a path of descent of the enclosure 100 from a position adjacent to the platform 102 to a terminal location (not shown).

Figure 2:
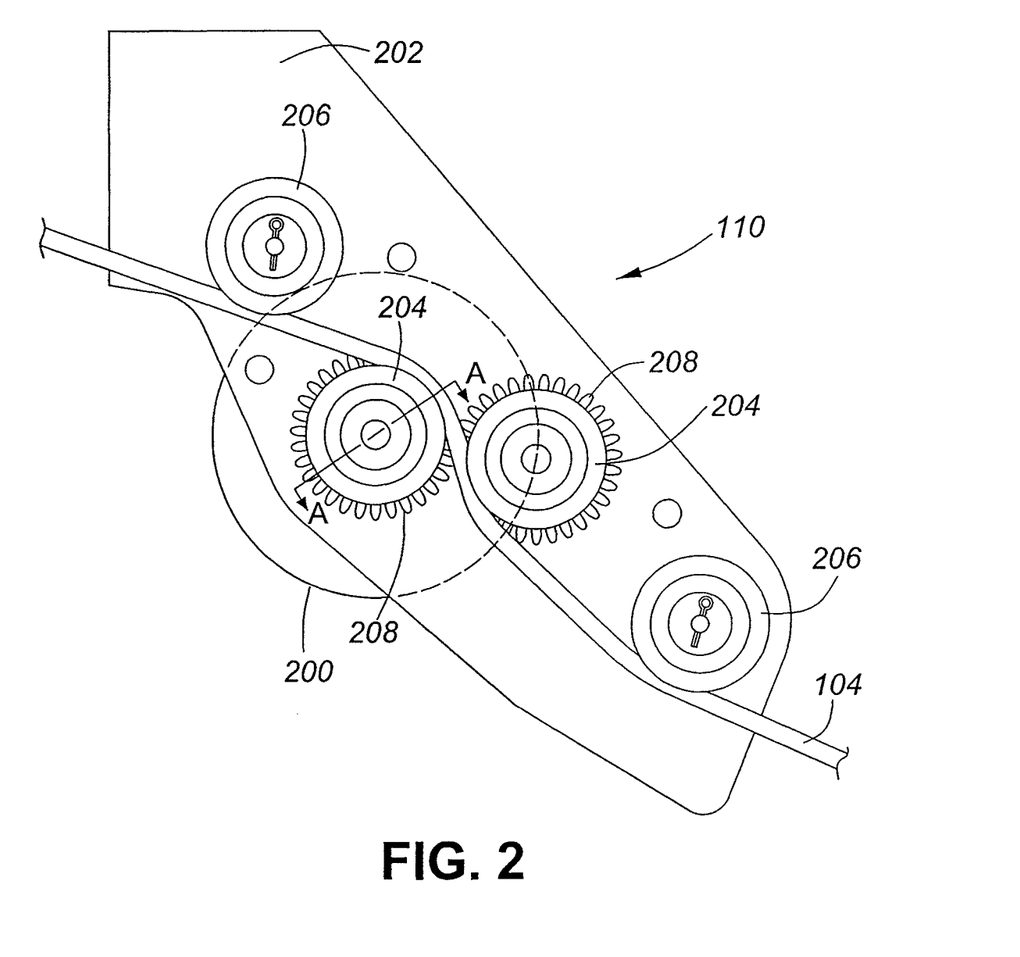
FIG. 2 is a detailed side view inside of a braking assembly of an enclosure of FIG. 1 wherein the braking assembly includes a descent control device partially behind and partially extending through the mounting plate of the braking assembly.

FIG. 2 shows a detailed side view inside of a braking assembly 110 of an enclosure 100 of the example embodiment in FIG. 1. The braking assembly 110 includes at least one descent control device 200 partially visible in front of mounting plate 202 in FIG. 2 and extending behind the mounting plate 202 to which the braking assembly 110 is attached. Preferably, one or more descent control devices 200 are used to ensure that the enclosure 100 descends at a controlled rate and manner.

In the example embodiment, the braking assembly 110 includes two driven sheaves 204 between two idler sheaves 206. All four sheaves are attached to the mounting plate 202. Each sheave has a peripheral surface in contact with the cable 104. In at least one example, the cable 104 runs through the braking assembly 110 passing under or over each of the four sheaves in such a manner that the cable 104 is in contact with a maximum of about ¼ of the diameter of any single sheave. At least one of the driven sheaves 204 is attached to, rotationally drives, and receives a rotational braking force from a descent control device 200 and thus acts as a drive assembly.

In the example embodiment, a drive gear 208 is attached to each descent control device 200. The teeth of the drive gears 208 are mutually interlocked so as to synchronize the rate of rotation of each driven sheave 204 preventing them from slipping against the cable 104 and losing synchronization. This configuration also allows the two driven sheaves 204 to cooperatively grip the cable 104 without slipping during descent. It will be understood that alternative examples wherein a different number of driven sheaves and idler sheaves are employed may be possible. Furthermore, although in the illustrated example embodiment the cable 104 passes directly over the top of the sheave 204 and directly under the bottom of the sheave 206, those skilled in the art will appreciate that other cable engagement configurations are possible.

During descent of the enclosure 100 from the platform 102, the sheaves 204, 206 rotate as the enclosure 100 travels down the path defined by cable 104 from a position proximate to the platform 102 to the terminal location. During rotation, the idler sheaves 206 bear no load and offer minimal resistance to the descent of the enclosure 100. They primarily aid in maintaining the position of the cable 104 as it passes along the driven sheaves 204. However, each driven sheave 204 drives a descent control device 200 which generates rotational braking force slowing the descent of the enclosure 100. How this braking force is generated is best explained with reference to FIG. 3.

Figure 3:
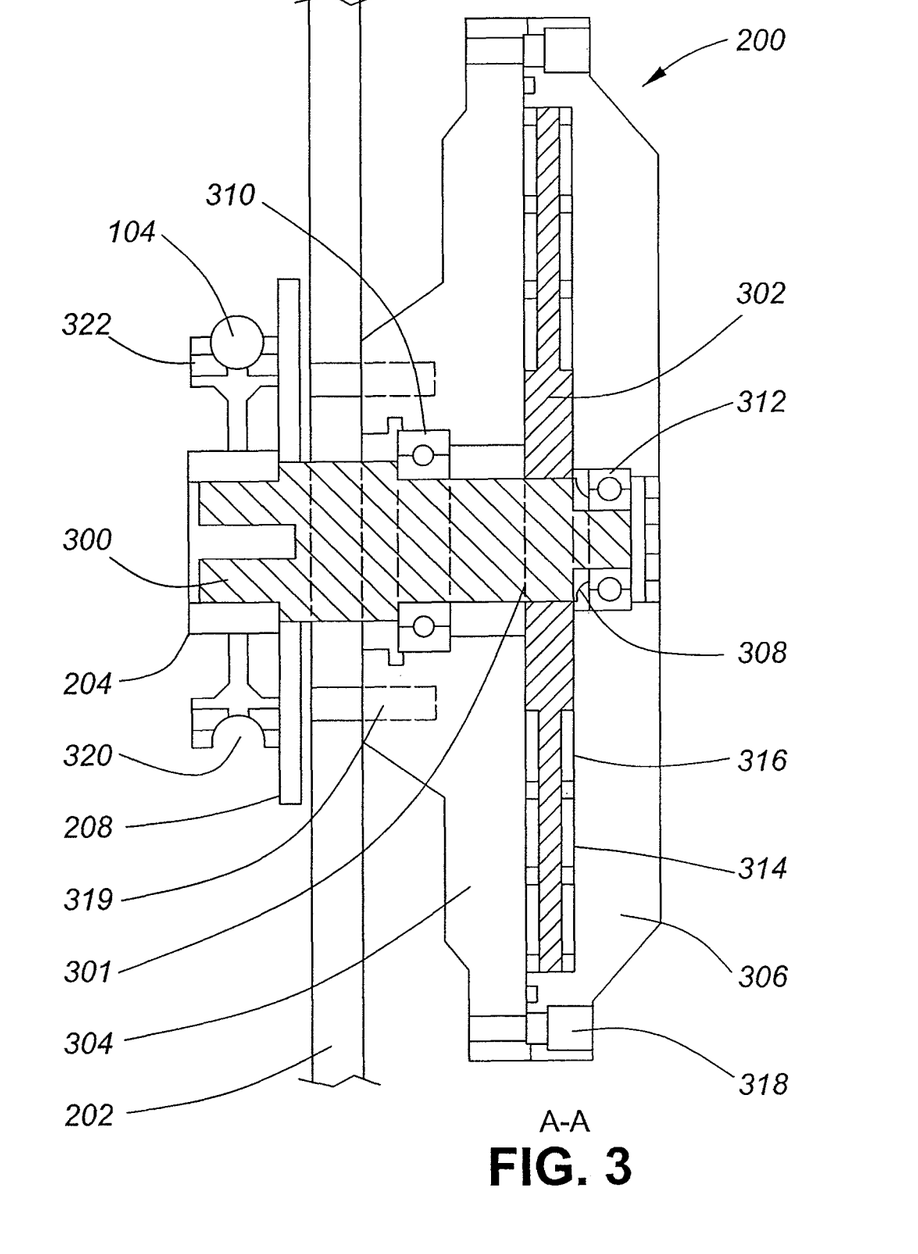
FIG. 3 is a detailed cross-sectional view of the braking assembly and the descent control device of FIG. 2 taken along line A-A.

FIG. 3 is an enlarged cross-sectional view along line A-A of a descent control device 200 mounted through the mounting plate 202 of FIG. 2. Descent control device 200 includes an input shaft 300 affixed to a rotor 302, a flange plate 304 connected to a back plate 306 which together form a conductor surrounding the rotor 302, a spacer 308 affixed to the input shaft 300 and holding the rotor 302 in place between the back plate 306 and the flange plate 304, a flange bushing or bearing 310 rotatably connecting the input shaft 300 to the flange plate 304 and a back bushing or bearing 312 rotatably connecting the input shaft 300 to the back plate 306. The rotor 302 includes a plurality of recesses 314 which receive magnets 316 in such a configuration that forms several distinct regions of polarity on the rotor 302. In the embodiment shown in FIG. 3, the descent control device 200 is attached to the mounting plate 304 by fasteners 319.

The input shaft 300 is preferably an elongate cylindrical member having a first end and a second end, through which the axis of rotation is defined, and a shoulder 301 about which the diameter of the input shaft 300 changes. The first end of the input shaft 300 is affixed to a driven sheave 204. The second end of the input shaft rotationally engages the flange bearing 310 and back bearing 312. The rotor 302 is mounted on the input shaft 300 at the shoulder 301. The spacer 308 is mounted on the input shaft 300 on the other side of the rotor 302 such that the position of the rotor 302 relative to the input shaft 300 is fixed both rotationally and longitudinally. The input shaft 300 drives rotation of the rotor 302 when it is rotated with the rotation of a driven sheave 204.

The rotor 302 is preferably a substantially planar ferromagnetic steel cylindrical disc which is centrally affixed to the input shaft 300 and held in place on the input shaft 300 between the shoulder 301 and the spacer 308. A side view of an example rotor 302 is displayed in FIG. 4 and in cross-sectional view in FIG. 5. The rotor 302 includes a plurality of recesses 314. In one embodiment, recesses 314 are present on both sides of the rotor 302. In an alternative embodiment (not shown) recesses 314 could pass completely through the rotor 302. Each recess 314 receives a magnet 316 having axial magnetization. All magnets 316 are mounted in the same magnetic pole orientation such that the main flux exiting the rotor 302 is of the same polarity. The return flux goes back to the rotor 302 in the area adjacent to each magnet 316.

In one embodiment, each recess 314 may be ¾" in diameter and ⅛" deep to receive a Neodymium rare earth or other fixed magnet 316. In some example embodiments, two rings of recesses 314 contain 48 magnets 316, on each side of the rotor 302. In an alternative embodiment, the rotor 302 may itself be a magnet 316, having a corresponding magnetic pole orientation, and obviating any use of recesses 314.

The flange plate 304 is formed of a conductive metal in such a shape as to encircle the input shaft 300 and enclose one side of the rotor 302. The flange plate 304 is connected to the flange bushing 310 which secures the axial position of the flange plate 304 relative to the input shaft 300 but permits rotational movement of the input shaft 300 relative to the flange plate 304. In one embodiment, the flange plate 304 is attached to the mounting plate 202 by fasteners 319 to secure the descent control device 200 to the enclosure 100 and to prevent axial rotation of the flange plate 304 during rotation of the input shaft 300. The flange plate 304 is connected to the back plate 306 at points radially distal from the rotor 302 such that the connected flange plate 304 and back plate 306 form a cavity inside of which the rotor 302 is proximate to both the flange plate 304 and the back plate 306 but may freely rotate relative thereto. The flange plate 304 forms part of the conductor in which eddy currents are induced.

The back plate 306 is formed of a conductive metal in a shape to enclose the second end of the input shaft 300 and the side of the rotor 302 not otherwise enclosed by the flange plate 304. The back plate 306 is connected to the back bushing 312, which secures the axial position of the back plate 306 relative to the input shaft 300 but permits rotational movement of the input shaft 300 relative to the back plate 306. The back plate 306 is connected to the flange plate 304 at points radially distal from the rotor 302 by means of a plate fastener 318 such that the connected back plate 306 and flange plate 304 form a cavity inside of which the rotor 302 is proximate to both the back plate 306 and flange plate 304 but may freely rotate. The back plate 306 forms another part of the conductor in which eddy currents are induced.

Thus, the rotation of the rotor 302 creates a traveling wave of magnetic field relative to the conductor which induces eddy currents between the conductor and the rotor. As such, the descent control device 200 operates passively in that there is no applied power or control to operate it. As long as the magnets 316 remain magnetized and relative motion is developed between the magnets 316 and the conductor, a braking force is generated. During rotation, a traveling wave magnetic field is in motion relative to a conducting medium. The relative motion of this wave induces eddy currents in the conductive medium in a pattern which mirrors that of the driving field. The induced eddy currents interact with the field of the magnets 316 to develop a braking force. The braking force is a function of the relative strengths of the magnets 316 and induced currents and their relative phase offsets. The magnitude and phase offset of the induced current varies as a function of the relative wave velocity, magnetic field strengths, wavelength of the field and conductor resistivity.

The shoulder 301 surrounds and forms a portion of the input shaft 300 around which the diameter of the input shaft 300 changes. One side of the rotor 302 abuts the shoulder 301 so as to maintain a minimum spacing between the rotor 302 and the flange plate 304.

The spacer 308 surrounds and abuts the input shaft 300 and abuts the other side of the rotor 302 opposite the shoulder 301 by contacting the inner race of back bearing 312. The spacer 308 holds the rotor 302 securely in place against the shoulder 301 of the input shaft 300 to maintain a spacing between the backing plate 306 and the rotor 302. The spacing between the rotor 302 and flange plate 306 and the spacing between the rotor 302 and the backing plate 306 prevent frictional contact between the rotor 302 and the flange plate 304 or back plate 306 and yet maintain a desired braking force of the descent control device 200.

The flange bearing 310 surrounds the input shaft 300 to hold the flange plate 304 in place axially while permitting rotation of the input shaft 300. The flange bearing 310 may be a ball bearing, bushing, spacer, sleeve, coupling or other such instrument which holds the flange plate 304 in place axially while permitting rotation of the input shaft 300.

The back bearing 312 surrounds the input shaft 300 to hold the back plate 306 in place axially while permitting rotation of the input shaft 300. The back bearing 312 may be a ball bearing, bushing, spacer, sleeve, coupling or other such instrument which holds the back plate 306 in place axially while permitting rotation of the input shaft 300.

The strength of the braking force is also proportional to the distance between the rotor 302 and the conductors and thickness of the conductors. Those having ordinary skill in this art will appreciate that the braking force may be controlled by adding or removing magnets 316; changing the displacement between the flange plate 304 and rotor 302; changing the displacement between the back plate 306 and rotor 302; changing the diameter of back plate 306, flange plate 304 or the rotor 302; changing the type or strength of the magnets 316; and changing the material from which the back plate 306, flange plate 304 and the rotor 302 are composed. For example, the back plate 306 and flange plate 304 could be composed of steel, while the rotor 302 could be composed of aluminum, especially if the magnets 316 were housed in the conductor plates 304 and 306. Alternatively, the rotor 302 could be composed of copper or laminated steel and copper or plastic.

Also visible in FIG. 3, a sheave channel 320 preferably semicircular in shape is carved into the circumferential end surface of each driven sheave 204 and idler sheave 206. The sheave channel 320 guides and increases traction of the cable 104. In an example embodiment, each sheave channel 320 is slotted to a specific size and spacing to accept the cable 104 there around in a traction fit and also acts to displace any debris that may have built up on the cable 104 such as snow, ice, grease, dirt, wax or the like.

To further assist in the removal of snow, ice, grease, dirt, wax, or the like, and to increase heat dissipation when the cable moves through the sheave channel 320, each driven sheave 204 or idler sheave 206, may include a series of channel bores 322 bored parallel to the axis of rotation near the circumferential end surface of each sheave and partially through the sheave channel 320.

Figure 4:
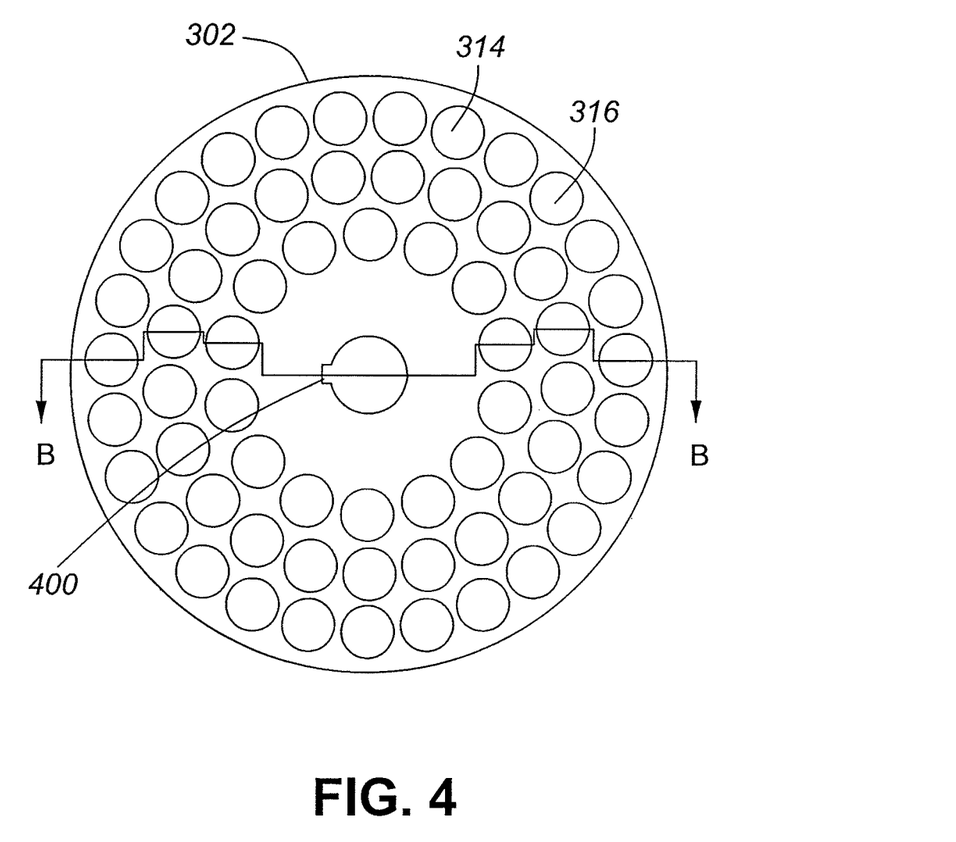
FIG. 4 is a plan view of a rotor for use in an example embodiment of the descent control device of FIG. 3.
Figure 5:
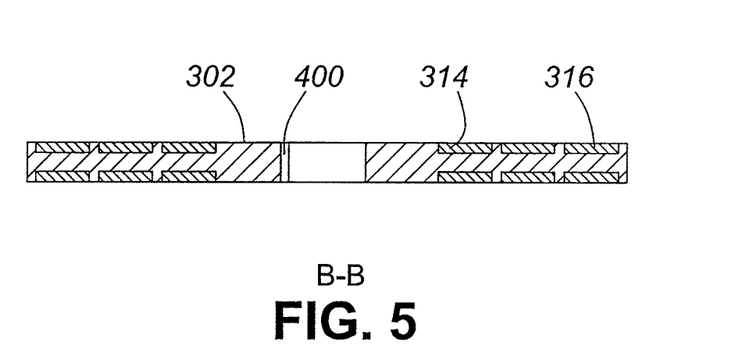
FIG. 5 is a cross-sectional view of the rotor of FIG. 4 along the line B-B.

Turning now to FIG. 4 and FIG. 5, an example rotor 302 is further described. In FIG. 4 a rotor 302 shaped as a cylindrical disc includes three rings of recesses 314 each recess 314 adapted to accept a magnet 316. At the center of the rotor 302 a key 400 is cut out of the rotor 302 to receive the shoulder 301 of the input shaft 300 in such a manner to affix the rotor 302 to the input shaft 300 for rotation together.

In FIG. 5, a cross section of the rotor of FIG. 4 along the line B-B illustrates one embodiment where a plurality of recesses 314 exist on both sides of rotor 302 for receiving magnets 316.

In a preferred example embodiment, the descent control device 200 consists of a steel rotor 302, aluminum (6061-T6) flange plate 304 and aluminum (6061-T6) back plate 306. The surface of the rotor 302 is spaced 0.040 inches from the flange plate 304 on one side and the same distance from the back plate 306 on the other. The flange bearing 310 and back bearing 312 are both ball bearings. The magnets 316 are NdFeB N42 0.750" diameter, 0.125" thick and 13,200 Gauss/ 3,240 surface field Gauss.

Figure 6:
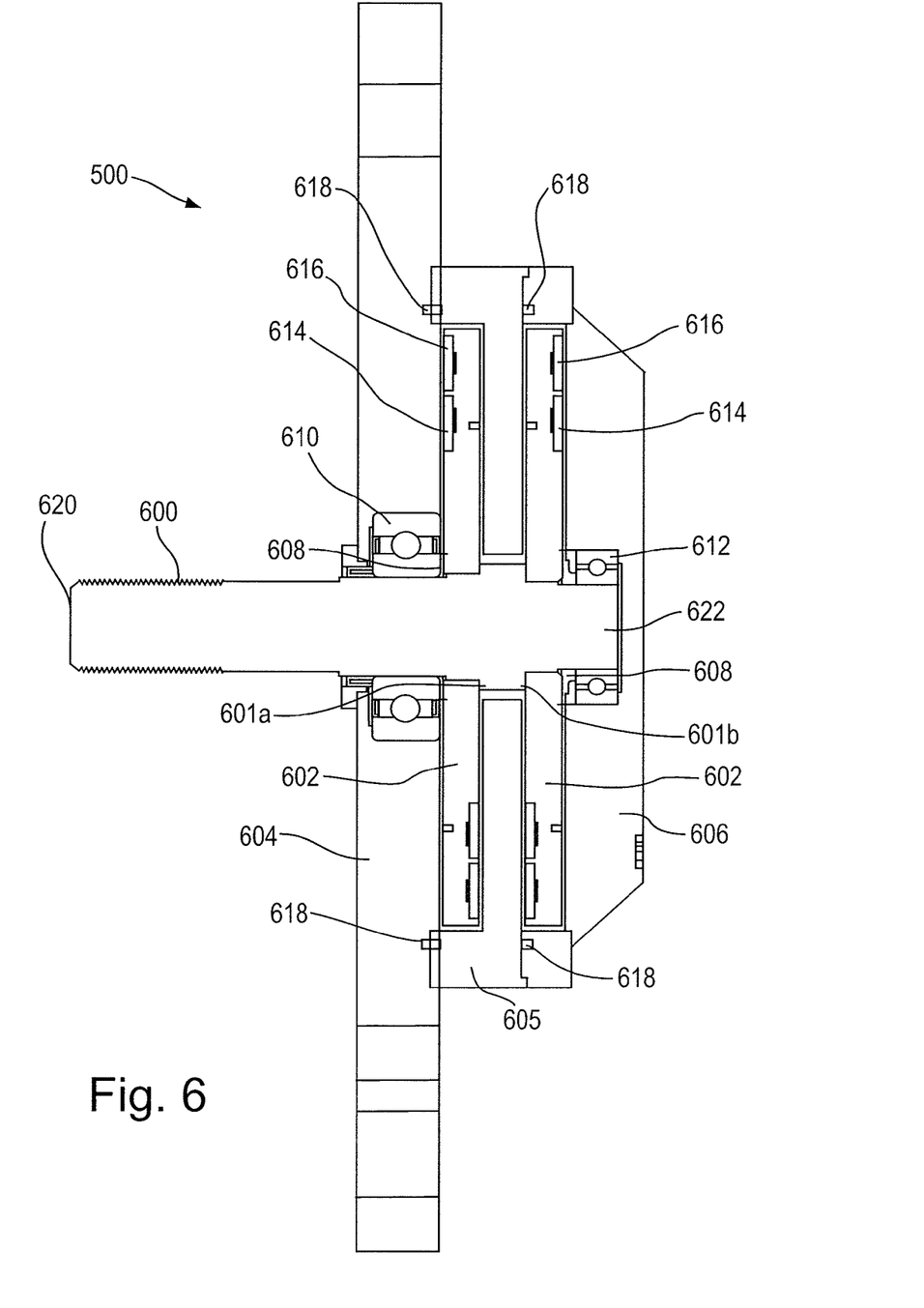
FIG. 6 is a detailed cross-sectional view of an alternative embodiment if the descent control device.

FIG. 6 is a cross-sectional view of an alternative embodiment of a descent control device 500 according to the present disclosure. The descent control device 500 includes an input shaft 600 on which a pair of rotors 602 are mounted. A flange plate 604 is rotatably mounted to the input shaft 600 via a flange bearing 601, and a middle plate 605 is mounted to the flange plate 604. Together, the flange plate 604 and middle plate 605 form a conductor substantially surrounding the first rotor 602. A back plate 606 is rotatably mounted to the input shaft 600 via a back bearing 612, and is affixed to the middle plate 605 at a point distant from the input shaft 600. Together, the back plate 606 and the middle plate 605 form a conductor substantially surrounding the second rotor 602.

The input shaft 600 is similar to the input shaft 300, with the exception that is has two shoulders 601a and 601b about which the diameter of the input shaft 600 changes. The diameter of the input shaft 600 increases at a first shoulder 601a, and decreases at a second shoulder 601b, creating a raised portion of the input shaft 600 between the shoulders 601a and 601b.

A first end 620 of the input shaft 600 is affixed to a driven sheave 204 and a second end 622 of the input shaft 600 rotationally engages the flange plate 604 and the back plate 606 via a flange bearing 610 and a back bearing 612, in substantially the same manner as the embodiment shown in FIG. 3. Each of the flange plate 604, the back plate 606, the flange bearing 610 and the back bearing 612 are substantially similar to the flange plate 304, back plate 306, flange bearing 310 and back bearing 312, respectively.

Each of the rotors 602 is similar to the rotor 302. The rotors 602 have recesses 614 (similar to recesses 314) for receiving magnets 616 (similar to magnets 316). The rotors 602 are mounted on the input shaft 600 at the shoulders 601a and 601b. Spacers 608 (that are similar to spacers 308) are inserted between the rotors 602 and the flange plate 604 and back plate 606 in substantially the same manner as the embodiment shown in FIG. 3, to fix the rotors 602 in position against the shoulders 601a and 601b, both rotationally and longitudinally, relative to the input shaft 600.

The middle plate 605 is provided between the flange plate 604 and the back plate 606. The middle plate 605 can be made from the same materials as the flange plate 604 and the back plate 606, or from any other material that the flange plate 604 and back plate 606 could be made from. The middle plate 605 engages the flange plate 604 at a point away from the input shaft 600. An "O"-ring 618 is provided at the interface between the flange plate 604 and the middle plate 605 to help prevent contaminants such as dirt from reaching the rotors 602. The middle plate 605 extends in an "L" shape from the flange plate 604 along the axis of the input shaft 600 and then toward the input shaft 600 between the rotors 602. The middle plate 605 does not contact either of the rotors 602 or the input shaft 600. In this configuration, the middle plate 605, in combination with the flange plate 604 forms a cavity in which the first rotor 602 can rotate freely proximate to the flange plate 604 and the middle plate 605.

The back plate 606 engages the middle plate 605 at the "bend" in its "L" shape. An additional "O"-ring 618 is provided at the interface between the middle plate 605 and back plate 606 to help prevent contaminants such as dirt from reaching the rotors 602. In this configuration, the middle plate 605, in combination with the back plate 606 forms a cavity in which the second rotor 602 can rotate freely proximate to the middle plate 605 and the back plate 606.

The flange plate 604, middle plate 605 and back plate 606 are held together by bolts (not shown) extending through channels formed by aligned bolt holes (not shown) in each of the flange plate 604, middle plate 605 and back plate 606. The bolts extend from a proximal end proximate the back plate 606 to a distal end proximate the flange plate 604. The distal ends of the bolts are threaded, and the threads engage corresponding threading provided on inner surfaces of the bolt holes in the flange plate 604. It will be apparent to those of skill in the art that other suitable means of fastening the flange plate 604, middle plate 605 and back plate 606 together are possible.

Rotation of the rotors 602 creates a traveling wave of magnetic field relative to the conductors surrounding the rotors 602 and induces eddy currents between the conductors and the rotors 602, in substantially the same manner as the embodiment shown in FIG. 3. It will be appreciated by those skilled in the art that descent control device 500 will create approximately twice the amount of braking force as descent control device 200, since twice as many rotors and magnets are provided. Actual test results show that descent control device 500 generates a braking force of approximately 80 lbs when rotating at 800 rpm. This is approximately twice the braking force generated by descent control device 200 when rotating at 800 rpm, which testing has shown to be approximately 38-40 lbs.

In some implementations, the descent control device 500 can be interchangeable with the descent control device 200. By connecting input shaft 600 to the driven sheave 204 in substantially the same manner that input shaft 300 can be connected to the driven sheave 204, and mounting the descent control device 500 to the mounting plate 202 (again, in substantially the same manner in which descent control device 200 is mounted to the mounting plate 202), the descent control device 500 can be used to slow the descent of the enclosure 100 along its path of descent in the same manner as descent control device 200. It should therefore be understood that references in this description to the descent control device 200 and its components shown in FIG. 3 can apply equally to the descent control device 500 and its components shown in FIG. 6.

In operation, the enclosure 100 descends along the path defined by at least one cable 104. Descent of the enclosure 100 along cable 104 causes rotation of at least one driven sheave 204 which causes rotation of the input shaft 300 of the descent control device 200. Rotation of the input shaft 300 causes rotation of the rotor 302 and the magnets 316 contained in the recesses 314 of the rotor 302. Rotation of the magnets 316 causes the magnetic field created by the axial polarity of the magnets 316 to rotate. The rotational movement of the magnetic field relative to the conductor (formed in one embodiment by the flange plate 304 and back plate 306) induces eddy currents in the conductor in a pattern which mirrors that of the magnetic field created by the magnets 316. Because the eddy currents and the magnetic field mirror each other, they interact to oppose the rotation of the magnetic field. This opposition to rotation of the magnetic field translates to a braking force against the rotation of the magnets 316 in the rotor 302, against the rotation of the input shaft 300, against the rotation of the driven sheave 204 and against the enclosure 100 descending along the cable 104. Consequently, the enclosure 100 descends along the path defined by the cable 104 at a rate controlled by the braking force of the descent control device 200.

Because the strength of the eddy currents is proportional to the velocity of the rotor 302 relative to the stationary conductor, as the rate of descent of the enclosure 100 increases, the braking force increases. Similarly, decreasing the rate of descent of the enclosure 100 decreases the braking force. This proportionality produces a smoother deceleration and allows the enclosure 100 to descend in a controlled manner towards the terminal location (not shown), resulting in a gentle landing. Rates of descent of about 14 ft/s (peak at around 22 ft/s) have been experienced for descents from high elevations, while more moderate descent elevations result in rates of descent of about 7-8 ft/s and landing speeds as low as 2 ft/s.

In simulation testing, a first-order analysis assumed a single pure sinusoid traveling magnetic wave due to field rotation. The simulation assumed a pole gap field amplitude of 3240 Gauss, conductor resistivity of $4 \times 10^{-8}$ ohm-m (aluminum), approximate gap field wavelength of 25 mm, drive sheave diameter of 4.0", effective rotor drag area (both sides) of 61 square inches, total weight of enclosure and contents of 600 lbs and descent by gravity at a 45 degree descent angle. This simulation of the magnetic drag (braking force) indicates that a pair of descent control devices applied to an enclosure is capable of producing a maximum of approximately 420 lbs of drag at a maximum descent speed of 28 ft/s, which is approximately equal to the gravity force of a 600 pound load descending at a 45° angle. The braking force decreases when descent speed exceeds 28 ft/s. At a descent speed of 12 ft/s, the drag force on the enclosure is approximately 180 lbs. However, this date should be treated as an estimate and approximate only.

In fact, the magnetic field is significantly more complex than a single pure sinusoid traveling magnetic wave, with higher order terms that will result in multiple traveling waves of different amplitudes and lengths. Each traveling wave will produce its own characteristic drag/speed curve. The total drag is the Fourier sum of the force contributed by each of these traveling waves. The higher order wave components due to edge effects tend to substantially increase the total braking force. As such, the total braking force may be in the range of 50% to 100% greater than that predicted by the single-wave analysis.

It will be apparent to those having ordinary skill in this art that various modifications and variations may be made to the embodiments disclosed herein, consistent with the present application, without departing from the spirit and scope of the present application.

For example, the magnets could be mounted in the back plate 306 and flange plate 304 and the conductor could be formed from the rotor 302.

Similarly, a descent control device 200 can be mounted in a braking assembly 110 by rotationally connecting the input shaft 300 to the mounting plate 202 or by affixing the flange plate 304 to the mounting plate 202.

In a further embodiment, the enclosure 100 includes a means for attachment to a trailer or fork lift to facilitate transportation when detached from cables 104 and/or the removable attachment of wheels to facilitate repositioning below the initial point.

In some implementations, the descent control device 200 (or the descent control device 500) can be used in many different applications to provide braking force, by rotationally connecting the input shaft 300 (or 600) to the moving component on which braking force is to be applied. By way of example, an enclosure such as enclosure 100 can be fixedly mounted to a loop of cable at a single point. The loop of cable can extend from a receiver sheave mounted to a raised platform from which a worker may need to escape to a terminal sheave located on the ground some distance away from the platform, defining a path of descent of the enclosure. The cable loop can move in a circular manner around the receiver sheave and terminal sheave when the enclosure descends along the path of descent. The terminal sheave can be rotationally connected to the input shaft 300 (or 600) of a descent control device 200 (or 500). In such a configuration, the rotation of the terminal sheave would drive the rotation of the rotor 302 (or 602), and the braking force generated by such rotation would in turn slow the rotation of the terminal sheave, thus slowing the descent of the enclosure.

Other embodiments consistent with the present application will become apparent from consideration of the specification and the practice of the application disclosed herein.

Accordingly, the specification and the embodiments disclosed therein are to be considered exemplary only, with a true scope and spirit of the invention being disclosed by the following claims.

What is claimed is:

1. A descent control device for controlling rotational motion of an object, the device comprising:
   at least one drive assembly configured for rotationally engaging the rotating object to be controlled;
   a first substantially planar ferromagnetic moving element in rotationally locked engagement with the at least one drive assembly, the first moving element comprising at least one recess formed in a surface thereof having at least one magnet fixedly disposed therein;
   a second substantially planar ferromagnetic moving element in rotationally locked engagement with the at least one drive assembly, the second moving element comprising at least one recess formed in a surface thereof having at least one magnet fixedly disposed therein;
   a first conducting plate disposed proximate to the first moving element; and
   a second conducting plate disposed proximate to the second moving element;
   whereby magnetic fields are induced by rotational movement of the first moving element relative to the first conducting plate and the second moving element relative to the second conducting plate, in directions to oppose acceleration of the at least one drive assembly as it rotationally engages the object to be controlled.

2. The descent control device of claim 1, wherein the magnetic field is induced in a direction transverse to a direction of movement of the moving elements.

3. The descent control device according to claim 1, wherein the moving elements are rotors.

4. The descent control device according to claim 1, further comprising a shaft fixed to and extending along the rotation axis of both the moving elements and the at least one drive assembly.

5. The descent control device of claim 1, wherein the moving element is composed of a material selected from a group consisting of ferromagnetic steel, iron and laminated ferromagnetic steel and iron.

6. The descent control device according to claim 1, wherein the at least one conducting plate is composed of a material selected from a group consisting of aluminum and steel.

7. The descent control device of claim 1, wherein the at least one conducting plate comprises first and second chamber portions surrounding the moving elements.

8. The descent control device of claim 7, wherein the at least one conducting plate further comprises a third chamber portion extending into a chamber formed by the first and second chamber portions, between the moving elements.

9. The descent control device of claim 1, wherein the magnets comprise fixed magnets.

10. The descent control device of claim 9, wherein the magnets comprise rare earth magnets.

11. The descent control device of claim 9, wherein the fixed magnets are disposed on the face of moving elements facing one of the at least one conducting plates.

12. The descent control device of claim 11, wherein one of the fixed magnets is disposed at a point the first moving element having an outwardly facing first polarity and a second one of the fixed magnets is disposed at a corresponding point on the second moving element having an outwardly facing second polarity opposite to the first polarity.

* * * * *